US009842354B2

(12) United States Patent
Hughes et al.

(10) Patent No.: US 9,842,354 B2
(45) Date of Patent: Dec. 12, 2017

(54) SIMULATOR FOR A REAL-TIME BIDDING SYSTEM (71) Applicant: Adobe Systems Incorporated, San Jose, CA (US)

(72) Inventors: John Hughes, Lafayette, CA (US); Adam Rose, San Pablo, CA (US); Yen Pai, El Cerrito, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 286 days.

(21) Appl. No.: 13/755,452

(22) Filed: Jan. 31, 2013

(65) Prior Publication Data

US 2014/0108159 A1  Apr. 17, 2014

Related U.S. Application Data (60) Provisional application No. 61/712,706, filed on Oct. 11, 2012.

(51) Int. Cl.
*G06Q 30/02*  (2012.01)

(52) U.S. Cl.
CPC .............................. *G06Q 30/0275* (2013.01)

(58) Field of Classification Search
CPC ................................................ G06Q 30/0275
USPC ...................................................... 705/14.71
See application file for complete search history.

(56) References Cited

U.S. PATENT DOCUMENTS 7,685,041 B1 *  3/2010  Yao et al. ....................... 705/35
8,224,689 B1    7/2012  Sandberg et al.
8,260,680 B2    9/2012  Tomak
2003/0101126 A1 *  5/2003  Cheung et al. ................. 705/37
2005/0080707 A1 *  4/2005  Glasspool ....................... 705/37
2008/0082400 A1    4/2008  Martel et al.
2008/0189169 A1 *  8/2008  Turpin et al. ................... 705/10
2009/0055249 A1    2/2009  Lieberman
2009/0094114 A1    4/2009  Rice et al.

(Continued)

OTHER PUBLICATIONS

Microsoft Computer Dictionary, Fifth Edition, 2002, Microsoft Press, p. 23.*

(Continued)

*Primary Examiner* — David Stoltenberg
*Assistant Examiner* — Michael Ezewoko
(74) *Attorney, Agent, or Firm* — Keller Jolley Preece (57) ABSTRACT A multistage online auction for electronic advertising is described including simulation. A first stage auction occurs internally within a demand-side platform where multiple advertiser clients compete to determine whose advertisement is submitted to at least one external auction site. Within the internal auction, an advertiser client optionally simulates their participation. All bidders enter a bid and campaign targeting parameters. A simulating bidder's campaign is processed in real time just as those of real bidders. Ad placement opportunities received from an external auction site are filtered for each campaign producing a list of targetable impressions. For each targetable impression, the client placing the highest real bid has their ad and bid submitted to the second stage external auction. A simulating bidder receives a report on targetable impressions for their campaign. A targetable impression for a simulated bid that is higher than any real bid is reported as a winnable impression.

18 Claims, 4 Drawing Sheets (56) References Cited

U.S. PATENT DOCUMENTS

| | | |
|---|---|---|
| 2009/0171728 A1 | 7/2009 | Yan et al. |
| 2010/0262498 A1 | 10/2010 | Nolet et al. |
| 2011/0231242 A1* | 9/2011 | Dilling et al. ............. 705/14.42 |
| 2011/0231264 A1 | 9/2011 | Dilling et al. |
| 2011/0246310 A1* | 10/2011 | Buchalter et al. ......... 705/14.71 |
| 2011/0313851 A1 | 12/2011 | Athey et al. |
| 2012/0316957 A1 | 12/2012 | Zhou et al. |

OTHER PUBLICATIONS

Mind—A Brief Introduction, John R. Searle, 2004, Oxford University Press, pp. 62-67.*
What is Thought, Eric Baum, The MIT Press, 2004, pp. 33-65.*
Robotics, Science and Systems III, Wolfram Burgard, Oliver Brock, and Cyrill Stachniss, The MIT Press, 2008, pp. 41-48.*

* cited by examiner

SIMULATOR FOR A REAL-TIME BIDDING SYSTEM

CROSS REFERENCE TO RELATED APPLICATIONS

This patent application claims priority from U.S. Provisional Patent Application Ser. No. 61/712,706, SIMULATOR FOR A REAL-TIME BIDDING SYSTEM, filed Oct. 11, 2012, the entirety of which is incorporated herein by this reference thereto.

BACKGROUND OF THE INVENTION

Technical Field

This invention relates generally to the field of online auctions. More specifically, this invention relates to online auctions for electronic advertising where bidders compete for advertisement impressions to be presented to viewers of electronic media.

Description of the Related Art

In the Real-Time Bidding (RTB) environment for electronic media impression auctions, an electronic advertising agency/consolidator operating a demand-side platform receives billions of daily auction opportunities for electronic media impressions from partners such as Google of Mountain View, Calif. ("Google®"), Yahoo! by Yahoo! Inc. of Sunnyvale, Calif. ("Yahoo!®"), etc. These partners operate auctions for advertising ("ad") impressions and then place electronic ads based on auction results. A partner's auction is considered an external auction with respect to a demand-side platform where an internal auction is also operated to determine which advertisements, also referred to herein as ads, and bids are submitted to the external auction. Each ad impression opportunity includes information parameters about the ad impression, for example but not limited to, the target website, geolocation of the user, ad size, user cookie, etc., that are used for targeting purposes. The demand side platform then processes hundreds of ads in their system, supplied by advertiser clients along with desired filtering parameters, against information parameters supplied by the partner, and filters out any ads that do not qualify, e.g. the ad does not want to target a particular site, such as youtube.com by YouTube, LLC of San Bruno, Calif. For ads that are not removed due to a mismatch with targeting parameters, the demand-side platform then evaluates the corresponding bids that represent how much each client advertiser is willing to pay. Because the demand-side platform can only send one ad/bid back to the partner offering the impression opportunity, an internal auction of all qualified/targetable ads within the demand-side platform is performed and then one ad/bid is selected to send back to the partner. Typically this is the ad with the highest value bid. An ad/bid winning an internal auction at the demand-side platform and being submitted to an external auction at the partner is not guaranteed of being placed. Such ad must also win the external auction. This entire process occurs in real-time and the demand side platform may only have milliseconds, for example, available to respond to an impression opportunity offered by a partner.

SUMMARY OF THE INVENTION

A multistage online auction for electronic advertising is described including simulation. A first stage auction occurs internally within a demand-side platform where multiple advertiser clients compete to determine whose advertisement is submitted to at least one external auction site. Within the internal auction, an advertiser client optionally simulates their participation. All bidders enter a bid and campaign targeting parameters. A simulating bidder's campaign is processed in real time just as those of real bidders. Ad placement opportunities received from an external auction site are filtered for each campaign producing a list of targetable impressions. For each targetable impression, the client placing the highest real bid has their ad and bid submitted to the second stage external auction. A simulating bidder receives a report on targetable impressions for their campaign. A targetable impression for a simulated bid that is higher than any real bid is reported as a winnable impression.

DETAILED DESCRIPTION OF THE INVENTION

A multistage online auction for electronic advertising is described including simulation. A first stage auction occurs internally within a demand-side platform where multiple advertiser clients compete to determine whose advertisement is submitted to at least one external auction site. Within the internal auction, an advertiser client optionally simulates their participation. All bidders enter a bid and campaign targeting parameters. A simulating bidder's campaign is processed in real time just as those of real bidders. Ad placement opportunities received from an external auction site are filtered for each campaign producing a list of targetable impressions. For each targetable impression, the client placing the highest real bid has their ad and bid submitted to the second stage external auction. A simulating bidder receives a report on targetable impressions for their campaign. A targetable impression for a simulated bid that is higher than any real bid is reported as a winnable impression.

It has been found that with prior art techniques, a problem may arise in that advertiser clients may like to know how many ad impressions are available for a given set of targeting parameters. Heretofore the only way to determine such is to aggregate historical information after an electronic ad campaign has been completed, a budget spent, and report to the advertiser client how many opportunities were processed and filtered out and how many remained after filtering. As such it may be desirable to have a capability to determine the potential results of a campaign in terms of targetable and winnable impressions without having to actually operate a real campaign including placing real bids with the associated expense.

The embodiments disclosed are examples of the many possible advantageous uses and implementations of the innovative teachings presented herein. In general, statements made in the specification of the present application do not necessarily limit any of the various claimed inventions.

Moreover, some statements may apply to some inventive features but not to others. In general, unless otherwise indicated, singular elements may be in plural and vice versa with no loss of generality. In the drawings, like numerals refer to like parts through several views.

While embodiments may be described herein for example with respect to electronic ads placed on websites on the Internet, the system and methods described may also be applied to any form of electronic advertising where auctions are used to determine ads shown to a viewer through an electronic means. Such electronic means may include but is not limited to: connected television; electronic ads which may appear on mobile devices; and other electronic displays such as electronic billboards and electronic displays in stores and malls, etc.

According to an embodiment, a dummy or simulated ad/bid from a simulating bidder is placed into the system implementing the demand-side platform and run all the way through to the end of the internal auction process. At the end, the demand-side platform pulls the advertisement out of consideration relative to the final decision that determines which ad is submitted to the external auction site. As a bidder's targeting criteria for an ad are evaluated against targeting parameters for an impression opportunity, counters are incremented to keep track of how many times a bidder's ad is removed or filtered from consideration for each targeting parameter.

In an embodiment, at the end of a campaign, these counters may be used to report to the bidder how many impression opportunities are targetable after filtering is performed, as well as how many ads in the campaign are removed or filtered out due to each specific targeting parameter. A targetable impression may also be considered a biddable impression. For simulating bidders supplying bids, the number of targetable or biddable impressions for a campaign that would have won the internal auction may be reported as a total of winnable impressions.

For example, in an embodiment, one ad might be filtered out or removed 10,000 times because the geolocation is not targetable and 200 times because the price is not high enough to have won the internal auction had the simulated bid instead been a real bid. By running the ad as if it were real, the demand-side platform may keep track of the counts and estimate what the simulating advertiser client bidder may have bid on had such bid been real and had such bid won the internal auction.

In an embodiment, the demand-side platform may also apply historical win rates in combination with simulated internal auction results to estimate a number of wins for a simulating bidder in an external auction conducted by partners, such as for example Google®, Yahoo®, etc. While winning the internal auction may not guarantee a win in the external auction, some estimate of probability can be supplied depending on the number of bidders in the internal auction. While not definitive, the more bidders that participate in the internal auction, the more likely the winning internal bidder is to compete well in the external auction.

It should be appreciated that such simulation process, overall, may provide the most accurate and real time estimation for targetable and winnable ad impression inventory and may enable an advertiser client to understand or determine how effective an ad campaign is regarding coverage and targets. For example, a simulation may allow an advertiser client to determine if they can cover a large enough quantity of impression opportunities to fill out their desired budget for a campaign, while at the same time focusing on specific target demographic segments and attributes. As well, such simulation process may provide the most accurate and real time estimation of how much the campaign may cost, without having to spend a campaign budget.

Figure 1:
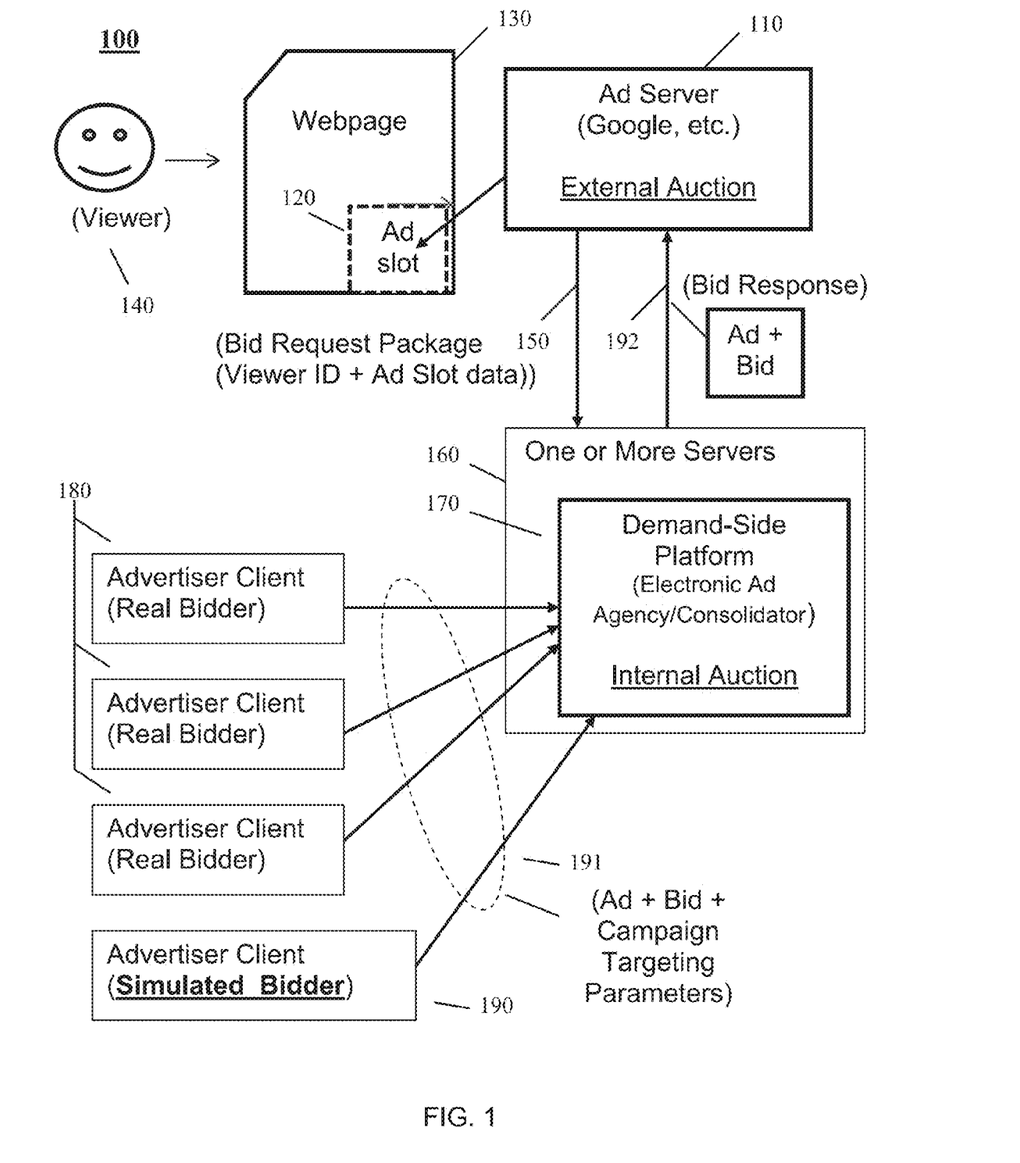
FIG. 1 is an overview block diagram showing system components and data flow, according to an embodiment.

As shown in an exemplary and non-limiting system block diagram 100 of FIG. 1, an external auction is conducted at a third-party partner 110 such as for example Google®, etc. For each ad impression to be placed in an Ad slot 120 on a webpage 130 for a particular viewer 140, partner 110 operates an auction in which a bid request package 150 representing an impression opportunity and containing targeting parameter data for each impression opportunity is supplied in real-time to potential advertisers. The targeting parameter data may consist of parameters describing the characteristics of either or both of the ad slot and also the viewer when identified. Viewers may be typically identified by their User ID, e.g. as stored in a browser cookie, when available.

According to an embodiment, an electronic ad agency/consolidator operating a demand-side platform 170 receives each bid request package 150 and may respond when appropriate with a bid response package 192 containing one advertisement and a bid. Demand-side platform 170 may consist of software programs operating on one or more servers 160 and operating typically in parallel. One or more servers 160 may be co-located, spread over different locations, located in the Cloud, or a combination thereof. The cloud can be thought of as the use of hardware and software that are delivered as a service over the Internet instead of on specific physical devices. For purposes of understanding herein, using servers that are part of a Cloud computing platform provide a capability to easily expand or contract the computing resources required so that a demand-side platform may quickly and efficiently adapt to client needs and pay for such computing resources needed at any point in time. In an embodiment, a provider of Cloud computing resources may provide IaaS or "Infrastructure as a Service". Associated with demand-side platform 170 are one or more advertiser clients, each of which may participate in an advertising campaign in which each bid request package 150 may be evaluated and responded to according to filtering parameters 191 supplied by the advertiser client for their particular ad campaign.

According to an embodiment, an advertiser client may participate as a real bidder 180 or as a simulating bidder 190. Regardless of whether an advertiser client is participating as a real bidder or a simulating bidder, the advertiser client may be but is not limited to being an individual, a firm, or a machine bidding on behalf of an advertiser. As such, such advertiser client may be considered in general as an entity participating as an advertiser client making a bid on an ad impression opportunity. Such entity may be co-located with the demand-side platform or alternately reside at a remote location.

For purposes of understanding herein, it should be appreciated that according documents supplied by the Open RTB project (http://openrtb.googlecode.com), the term, bidder, may also refer to a bidder service component of a demand-side platform that communicates with the auction service component operating the external auction at the partner. A partner may also be described as a sell-side of a transaction. A viewer may also be referred to as a consumer.

Figure 2:
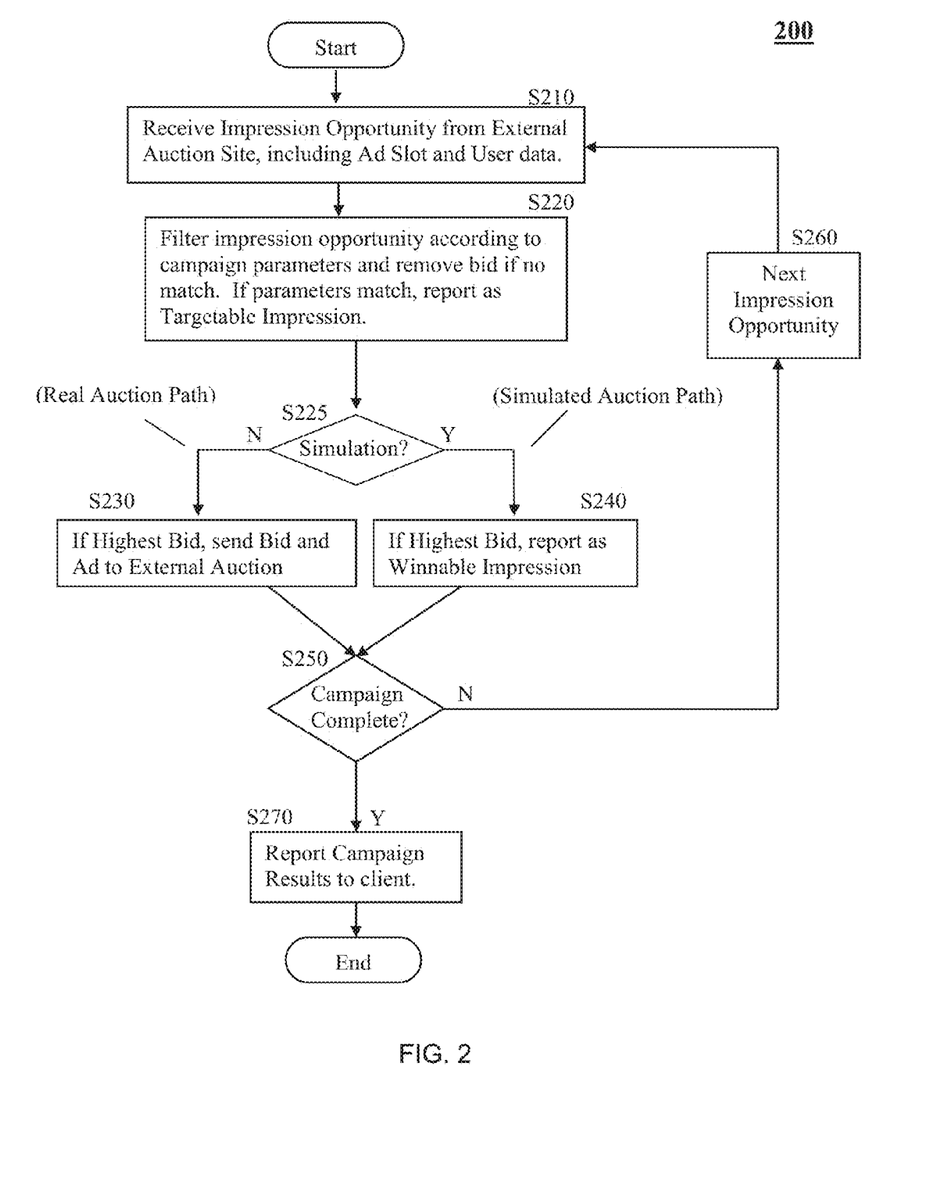
FIG. 2 is a flowchart of a process for executing advertising campaigns where the filtering and bidding processes are repeated for each impression opportunity, according to an embodiment.

Flowchart 200 shown in exemplary and non-limiting FIG. 2 describes a process for operating advertising campaigns for both real bidders and simulating bidders according to an embodiment. In S210 a demand-side platform receives a bid request package containing impression opportunity data from an external auction site, typically including both ad slot and viewer/user related data. Next, in S220 the impression opportunity is filtered according to campaign filtering parameters supplied by each bidder. At each stage of the filtering process a bid is removed when the campaign parameters for that bid do not match the parameters supplied by the external auction site in the impression opportunity package. After the particular impression opportunity has been through a complete filtering process for each bidder's campaign, such opportunity may be reported to the bidder as a Targetable Impression, assuming the impression opportunity was not removed from consideration due to not matching a bidder's targeting parameters.

Up to and including S220, campaigns for real and simulating bidders may be treated identically. Thereafter the process diverges per S225 according to the procedure for processing real vs. simulating bidders. In S230 a real bidder having the highest bid may have a package containing an ad and bid sent to the external auction for possible placement depending on the external auction results. Alternately, when a bidder is a simulating bidder, S240 determines whether the simulated bid would have won the auction had such bid instead been a real bid. When such simulated bid would have won the auction, the particular impression opportunity being processed may be reported to the simulating bidder as a winnable impression. In S250, it is determined whether a bidder's campaign is complete. When the bidder's campaign is determined not to be complete, the demand-side platform proceeds to evaluate the next impression opportunity 260 supplied by an external auction site, whereupon the process starts again at S210.

It should be appreciated that successive impressions received by the demand-side platform may come from different external auction sites and represent opportunities having considerably different bid request packages and impression opportunity data. For instance the client bidder may wish to target only ad impressions on Google pages and only for females who reside in the San Francisco Bay area. One impression opportunity received by the demand side platform may meet all these criteria, while the next impression opportunity received by the demand side platform might be for an impression on a Yahoo page where the viewer is male and resides in New York City.

An exemplary and non-limiting list of possible criteria to determine when a bidder's campaign is complete may include, but is not limited to, for example: a predetermined budget has been exhausted; a predetermined time has completed; a predetermined targetable or winnable impression count has been reached; and a manual instruction to terminate the campaign has been supplied by an advertiser client bidder.

In S270, the campaign results for a completed campaign may be reported to both real and simulating advertiser client bidders. In an embodiment, a simulating client bidder having just completed a campaign, may evaluate filtering effects of the campaign's targeting parameters as presented in results per FIG. 4, may revise targeting parameters, and may run another campaign in a simulated manner to see whether the results may be improved with an alternate set of targeting/filtering parameters. Additionally according to an embodiment, a simulating client bidder may choose to run a number of short campaigns and have results reported in aggregation over the short campaigns or reported as an average of results of several short campaigns. Because the makeup of impression opportunities may change over the course of time as impression opportunities flow to the demand-side platform from a variety of external auction sites, such aggregation may provide to an advertiser client a better indication of how their campaign will perform in the future. For instance during one period of time, the flow of simulated impression opportunities may be mostly from a specific partner site, while when the same bidder runs a real campaign, the flow of impressions may come from mostly other partner sites. So, by running a series of shorter simulated campaigns and aggregating the results, the simulation data covers a broader expanse of time and therefore may provide a closer correlation with a real campaign run at a time in the future, by virtue of being exposed to a broader spectrum of possible auctions.

Figure 3:
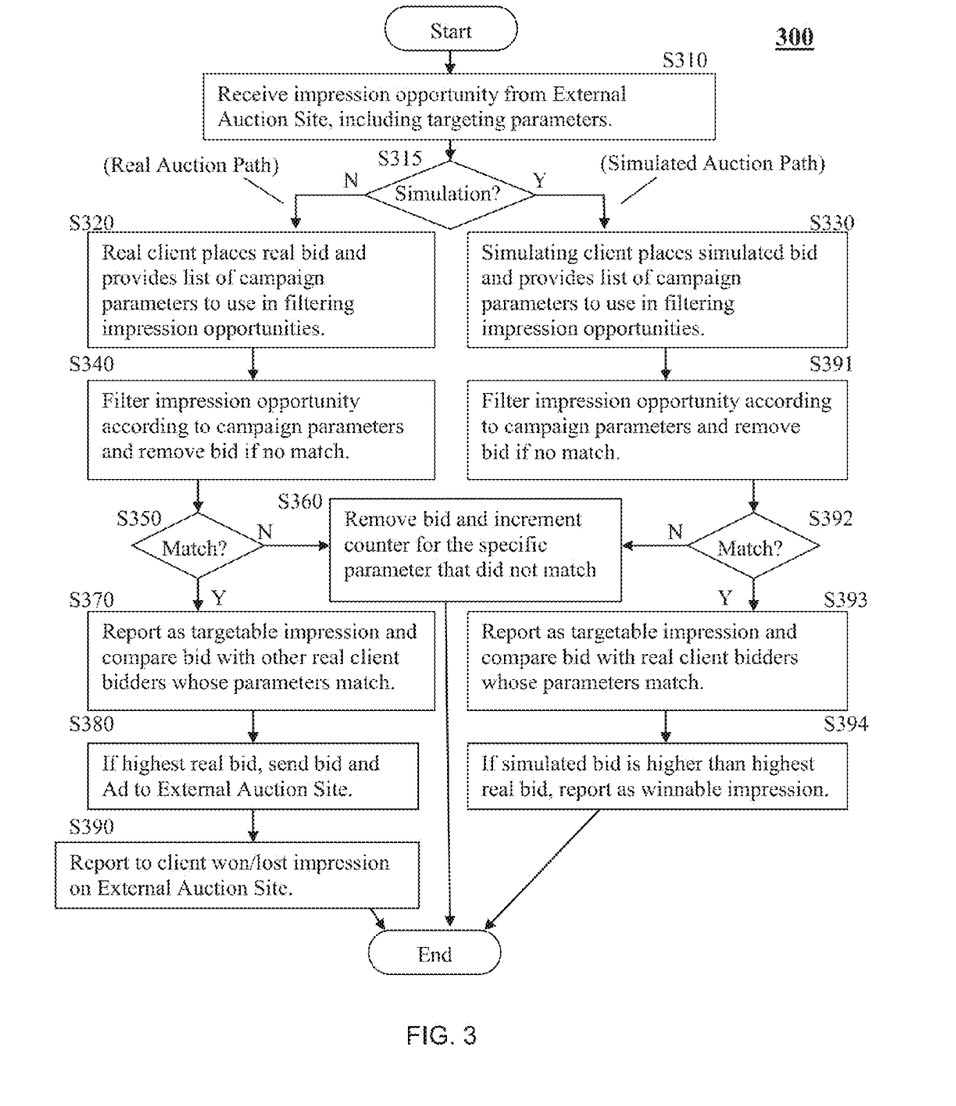
FIG. 3 is a flowchart describing a process for filtering each impression opportunity and bidding, according to an embodiment.

Flowchart 300 shown in exemplary and non-limiting FIG. 3 describes an exemplary procedure for processing a specific impression opportunity received from an external auction site, with particular attention to how the impression opportunity is processed with respect to both real bidders and simulating bidders according to an embodiment. The demand-side platform receives an impression opportunity S310 from an external auction site including a bid request data package containing targeting parameters for an ad slot, a specific viewer, or both. Next as shown in FIG. 3, the process is shown diverging per S315 for real bidders and simulating bidders. However, it may be appreciated that the path for real bidders encompassing S320, S340, S350, and S370 correlate to S330, S391, S392, and S393 for simulating bidders. As such, an embodiment treats a simulating bidder as a real bidder until filtering of ad impression opportunities is completed and a decision is made relative to an advertiser client bidder's bid.

In an embodiment, in S320 a real client bidder places a real bid and provides a list of campaign filtering parameters for use in filtering the impression opportunity. In S340 the ad impression opportunity is filtered according to the real bidder's campaign parameters. When there is no match per S350 between the impression opportunity parameters and those required by the real bidder's filtering criteria, the particular ad impression is removed S360 from consideration and a counter is incremented per the process described for FIG. 4. Such counter tracks the number of times a bidder's ad is removed due to the particular filter criteria. When the real bidder's campaign parameters match the parameters for the impression opportunity, then per S370, the impression opportunity is reported as a Targetable Impression. Subsequently, the real bidder's bid is compared with those of other real bidder advertiser clients, the campaign parameters of which also match the parameters for the impression opportunity. Per S380 when a particular real bidder has placed the highest bid, then such bid and ad are sent to the external auction site to compete for placement of the impression by an ad server associated with the external auction site. When the real bidder did not place the highest bid, then the impression opportunity is reported as bid but lost for the internal auction. In S390, a report is supplied by the demand-side platform to the real bidder who won the internal auction as to whether they won or lost the auction at the external auction site. Bidders may also optionally be informed of bids lost on the internal auction site.

In an embodiment, when there are equivalent real bids in the internal auction, then the demand-side platform may choose the bid considered more relevant to the specific viewer based on evaluating the viewer's cookie information, when supplied, thus determining that based on what is known about the specific viewer, one client bidder's ad is more relevant than another. For instance if one ad would appeal to a female and a second ad is more for a general audience, and from the viewer's cookie information they are known to be female, then the invention may choose to bid the ad targeted at females for the external auction, given that both ads bid the same amount in the internal auction. Alternately, when two real bidders both submit the highest bid, the demand-side platform may pick one such bid randomly to submit to the external auction site.

In an embodiment, the bid price for each advertiser client bidder is adjusted by the demand-side platform for each impression opportunity. For each impression opportunity, the demand-side platform may assign a relevance score to the impression opportunity in the context of each ad and viewer characteristics, when available, as well as the unique campaign targeting criteria for a particular advertiser client bidder. A higher score may indicative that the ad to be placed is more relevant to the context of the impression opportunity. For example in the scenario described above where a first ad would appeal to a female and a second ad is more for a general audience, if a specific viewer's cookie information shows they are known to be female, then the first ad would score higher than the second ad for relevance relative to the specific viewer.

In an embodiment, an advertiser client may submit a maximum bid limit for an overall campaign. Subsequently, for some impression opportunities, the demand-side platform may choose to place a bid on behalf of that advertiser client that is lower than the maximum bid limit for relevance scores that are not high. Such techniques enable the demand-side platform to fulfill the campaign as inexpensively as possible. For example, when a viewer is in a target demographic segment, e.g. Female, 25-35, that is especially relevant to the product/service in an ad which has been designed to target females 25-35, then the score for the impression opportunity is higher relative to that ad and the demand-side platform may choose a higher bid price. As another example, when the viewer is exploring or intending to book a flight to Hawaii and the product/service in the ad is especially relevant to travel or Hawaii, then the demand-side platform may choose a higher bid price than if the viewer was planning a trip to Russia. In general, when a bid request package includes a viewer of particular interest with respect to the context of the ad, the opportunity receives a higher score and the demand-side platform may place the maximum allowable bid as previously set by the particular advertiser client bidder. In an embodiment, the advertiser client has the ability to set or change their maximum bid at any time. In different embodiments, the adjustment of a bid based on a relevance score with regard to a particular impression opportunity may be performed in the internal auction only, the external auction only, or in both auctions.

Simulating Bidders.

In an embodiment, simultaneous with processing an impression opportunity for real bidders, the same impression opportunity is processed for one or more simulating bidders. Per S330 a simulating advertiser client places a simulated bid and provides a list of campaign parameters to use in filtering the impression opportunity. In S391 the ad impression opportunity is then filtered according to the simulating bidder's campaign parameters. When there is no match per S392 between the impression opportunity parameters and those required by the simulating bidder's filtering criteria, the particular ad impression is removed S360 from consideration. When the simulating bidder's campaign parameters match the parameters for the impression opportunity, then per S393 the impression opportunity is reported as a Targetable Impression.

In an embodiment, in S393 the simulating bidder's bid is compared with those of real bidder advertiser clients the campaign parameters of which also match the parameters for the impression opportunity. When the simulated bid is higher than the highest real bid placed for the same impression opportunity, then the impression opportunity is reported to the simulating bidder as a winnable impression per step S394. When the simulating bidder did not place the highest bid, then the impression opportunity is reported as a bid that would have lost the internal auction had the bid been real and not simulated.

In an embodiment, a simulating bidder's bid may also be compared with bids of other simulating bidders in addition to those of real bidders, thus broadening the base of comparison and providing a more realistic simulation result if for some reason there were only a small number of real client bidders participating at the time the simulation is run. When a simulating bidder's bid is also compared with bids of other simulating bidders, to be reported as a winnable impression a simulating bidder's bid must be higher than all real bids and all other simulated bids.

Filtering Process.

Figure 4:
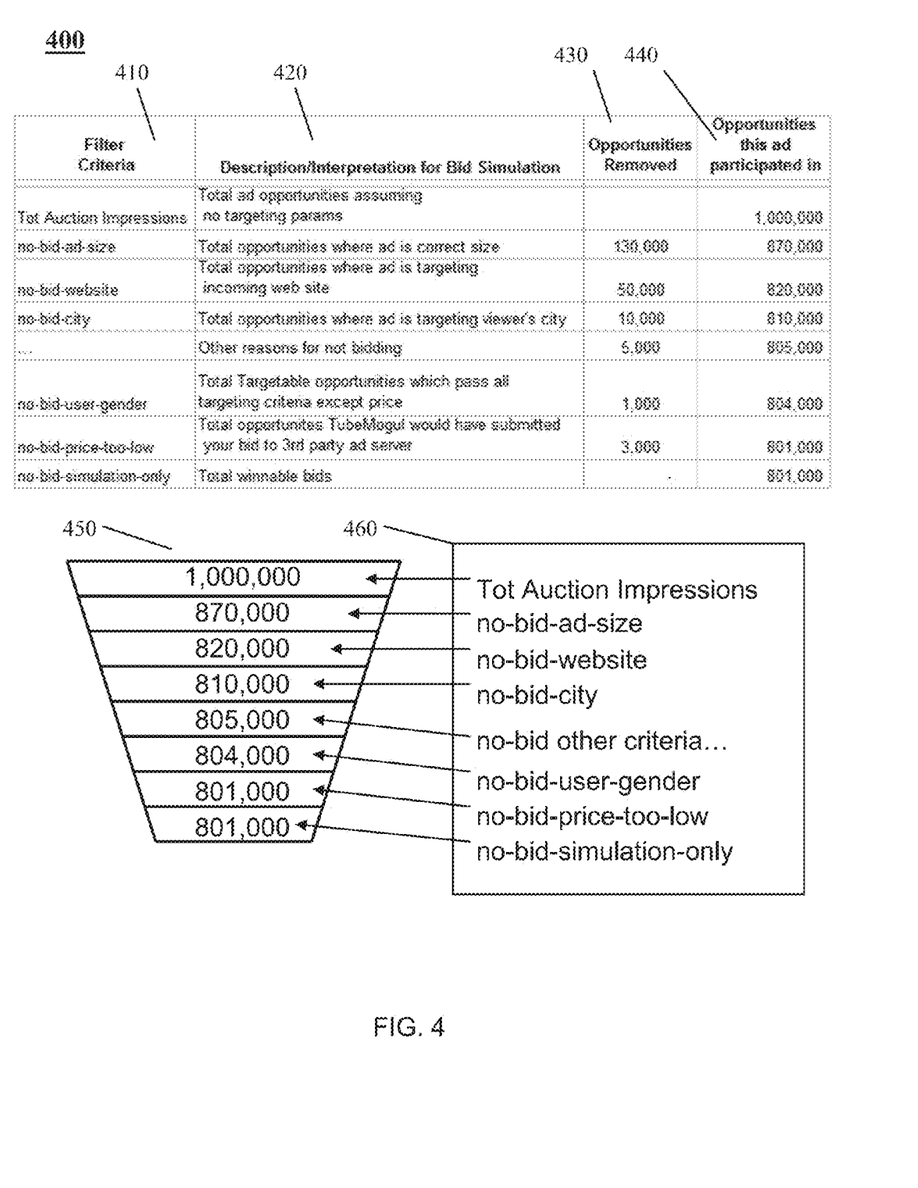
FIG. 4 is a flowchart describing a filtering process for impression opportunities in detail, according to an embodiment.

In accordance with an embodiment, an exemplary and non-limiting view of a detailed filtering process for ad opportunities over the course of an advertising client bidder's campaign, including but not limited to example filtering parameters, is included in table 400 of exemplary and non-limiting FIG. 4. FIG. 4 shows information reported to a simulating bidder. Specific filtering criteria 410 are applied at each step of the filtering process. A more detailed description of each exemplary filtering criterion is shown in column 420. The process starts, for example, with a total number of impression opportunities for the particular ad to participate in equal to 1,000,000 as shown at the top of column 440. Per this example the first filtering criteria applied relates to the size of the ad supplied by the bidder. Out of the total 1,000,000 possible ad impressions, over the course of the campaign 130,000 impression opportunities are removed per column 430 because the ad size for the impression opportunity does not match the size of the ad supplied by the bidder for this campaign. This number 130,000 represents a counter which tracks the number of impression opportunities removed due to the "no-bid-ad-size" filtering parameter over the course of the campaign. Likewise, a counter is provided for each of the filtering parameters to track how many impression opportunities are removed due to not matching a particular filtering parameter over the course of the campaign. In this campaign example, filtering parameters included are: no-bid-ad-size; no-bid-website; no-bid-city; no-bid other criteria . . . ; no-bid-user-gender; no-bid-price-too-low; no-bid-simulation-only. One skilled in the art would readily recognize that such particular parameters are illustrative only and are not meant to be limiting.

Example Parameters.

In accordance with an embodiment and with reference to FIG. 4, the parameter "no-bid-website" for example indicates that the target website where an ad server responding to the external auction would place the ad according to the impression opportunity is not a website that the bidder wishes to advertise on according to their campaign requirements. The parameter "no-bid-city" indicates that a geolocation parameter has been provided for the impression opportunity and the viewer's city does not match the city parameter for the campaign's filtering criteria. The parameter "no-bid-user-gender" indicates that the viewer's gender was included in the ad impression data and does not match the campaign's filtering criteria. The parameter "no-bid-price-too-low" indicates that within the internal auction the value of the bid placed by the bidder was not the highest bid.

For a simulating bidder, such condition makes the ad impression targetable but not winnable. Last, the parameter "no-bid-simulation-only" indicates that this campaign was a simulated campaign and therefore even when the value of the bid had been higher than those placed by real bidders for impression opportunities covered by this campaign, no bid would have been transferred to the external auction site to compete for an actual ad placement.

Column 440 in table 400 shows the number of opportunities the bidder's ad would have participated in, were the bidder instead a real bidder. At the bottom of column 440 the total winnable bids are shown, in this case 801,000, representing the total number of targetable impressions for the simulating bidder where their bid was higher than any real bidder.

A funnel diagram 450 is shown representing the opportunities remaining for the specific ad after each stage of the filtering process as previously shown in column 440 of table 400.

Table 460 shows the corresponding filtering parameters used at each stage of the filtering process of funnel 450.

One of the filtering parameters shown in table 460 is described as "no-bid-other-criteria . . . " and represents the universe of other possible filtering parameters that might be applied during one or more filtering steps according to an embodiment.

An exemplary and non-limiting list of possible filtering/targeting parameters is shown below in no particular order:
- Site targeting (website or any electronic display where advertising media may be placed);
- Geo (city, state, DMA, zip, country);
- Daypart or weekday (M, W, F breakfast time, etc.);
- Brand safety (Rating: G, R, PG; No Alcohol; No Drugs);
- Topics or Keywords (soccer, iPhone, Honda, BP etc.);
- Devices (OS, Browser, Device, Manufacturer);
- User/Viewer frequency of seeing the ad (once a day, once a week, etc.);
- User/Viewer's inclusion in a predetermined list (user was detected on an automotive site, user performed a search for shoes);
- User/Viewer's demographic (Age, gender, Household size, Income, etc.);
- Advertiser's ad was too long or big for the ad slot on auction;
- Advertiser's ad is blocked by a website or publisher providing the ad slot; and
- Ad parameters are not supported by a publisher providing the ad slot.

Thus, a multistage online auction for electronic advertising including simulation has been described in accordance with various embodiments.

It should be appreciated by a person skilled in the art that methods, processes, and systems described herein may be implemented in software, hardware, firmware, or any combination thereof. The implementation may include the use of a computer system having a processor and a memory under the control of the processor, the memory storing instructions adapted to enable the processor to carry out operations as described hereinabove. The implementation may be realized, in a concrete manner, as a computer program product that includes a non-transient and tangible computer readable storage medium storing instructions adapted to enable a computer system to perform the operations as described above.

The invention claimed is:

1. In a digital medium environment for real-time bidding on advertisement opportunities, a computer-implemented method for identifying one or more filtering parameters and providing advertisements to viewers by operating an online auction for electronic advertising including both real bidders and simulating bidders, the method comprising:
   receiving by a Demand Side Platform included on one or more servers, through a network communication system, an online advertisement impression opportunity package from an external online auction server;
   operating, by at least one processor, an internal auction by the Demand Side Platform, wherein the internal auction is operated independently of the external online auction server, wherein operating the internal auction comprises:
      receiving filtering parameters and a bid from a real advertiser client bidder;
      receiving filtering parameters and a simulated bid from a simulating advertiser client bidder;
      filtering, by the at least one processor, the online advertisement impression opportunity package according to the filtering parameters from the real advertiser client bidder and the filtering parameters from the simulating advertiser client bidder; and
      based on a determination that the online advertisement impression opportunity package matches the filtering parameters from the real advertiser client bidder and based on a determination that the bid from the real advertiser client bidder for the online advertisement impression opportunity package is a highest bid, placing the bid from the real advertiser client bidder for the online advertisement impression opportunity package at the external online auction server; and
   generating, by the at least one processor, a report for the simulating advertiser client bidder, wherein:
      based on a determination that the online advertisement impression opportunity package matches the filtering parameters from the simulating advertiser client bidder, the report indicates that the online advertisement impression opportunity package is a targetable impression; and
      based on a determination that the simulated bid of the simulating advertiser client bidder for the online advertisement impression opportunity package is higher than the highest bid, the report to the simulating advertiser client bidder indicates that the online advertisement impression opportunity package is a winnable impression;
   in response to providing the report to the simulating advertiser client bidder, receiving revised filter parameters for a real bid from the simulating advertising client bidder, wherein the revised filter parameters are selected based on the provided report;
   receiving by the Demand Side Platform a second online advertisement impression opportunity package from at least one external online auction server; and
   based on the revised filter parameters for the real bid of the simulating advertiser client bidder, providing an advertisement associated with the real bid to the at least one external online auction server for display to a viewer corresponding to the second online advertisement impression opportunity package.

2. The method of claim 1, wherein operating the internal auction by the Demand Side Platform further comprises repeatedly filtering additional impression opportunities for the real advertiser client bidder until a criteria is met for the real advertiser client bidder that indicates a campaign corresponding to the internal auction for the real advertiser client bidder should end.

3. The method of claim 2, further comprising generating a second report for the real advertiser client bidder indicating a total number of impression opportunities that remained after filtering the online advertisement impression and the additional impression opportunities.

4. The method of claim 3, further comprising based on a determination that the second online advertisement impression opportunity package matches the revised filtering parameters, responding to the second online advertisement impression opportunity package by sending a bid response package corresponding to the advertisement.

5. The method of claim 4, wherein the bid response package comprises the advertisement and a bid for the simulating advertiser client bidder for utilization in an external auction conducted by the at least one external online auction server.

6. The method of claim 1, wherein operating the internal auction further comprises:
receiving a second bid from a second real advertiser client bidder;
determining that the bid from the real advertiser client bidder and the second bid from the second real advertiser client bidder are equivalent highest bids;
determining that the bid from the real advertiser client bidder is more relevant to the online advertisement impression opportunity package than the second real bid based on a browser cookie associated with the online advertising impression opportunity package; and
sending the bid from the real advertiser client bidder for the online advertisement impression opportunity package to the external online auction server based on the determination that that the bid from the real advertiser client bidder and the second bid are equivalent highest bids and the determination that the bid from the real advertiser client bidder is more relevant to the online advertisement impression opportunity than the second bid.

7. The method of claim 1, further comprising:
generating a relevance score for the online advertisement impression opportunity package based in context of an advertisement corresponding to the real advertiser client bidder, viewer characteristics corresponding to the online advertisement impression opportunity package, and campaign targeting criteria for the real advertiser client bidder; and
adjusting the bid for the real advertiser client bidder based on the generated relevance score.

8. The method of claim 7, further comprising:
receiving a maximum bid limit for an overall campaign corresponding to the real advertiser client bidder;
determining that the generated relevance score is greater than a predetermined threshold value; and
based on the determination that the generated relevance score is greater than the predetermined threshold value adjust the bid to the maximum bid limit.

9. In a digital medium environment for real-time bidding on advertisement opportunities, a system for identifying one or more filtering parameters and providing advertisements to viewers by operating an online auction for electronic advertising including both real bidders and simulating bidders, comprising:
one or more servers comprising one or more processors and at least one non-transitory computer readable storage medium storing instructions that, when executed by the one or more servers, cause the system to:
receive an online advertisement impression opportunity package through a network communication system from an external online auction server;
operate an internal auction, wherein the internal auction is operated independently of the external online auction server, wherein operating the internal auction comprises:
receiving filtering parameters and a bid from a real advertiser client bidder;
receiving filtering parameters and a simulated bid from a simulating advertiser client bidder;
filtering the online advertisement impression opportunity package according to the filtering parameters from the real advertiser client bidder and the filtering parameters from the simulating advertiser client bidder; and
based on a determination that the online advertisement impression opportunity package received from the external online auction server matches the filtering parameters from the real advertiser client bidder and based on a determination that the bid of the real advertiser client bidder for the online advertisement impression opportunity package is a highest bid, placing the bid at the external online auction server for the real advertiser client bidder; and
generate a report for the simulating advertiser client bidder, wherein:
based on a determination that the online advertisement impression opportunity package matches the filtering parameters from the simulating advertiser client bidder, the report to the simulating advertiser client bidder indicates that the online advertisement impression opportunity package is a targetable impression, and
based on a determination that the simulated bid of the simulating advertiser client bidder for the online advertisement impression opportunity package is higher than the highest bid, the report to the simulating advertiser client bidder indicates that the online advertisement impression opportunity package is a winnable impression;
in response to providing the report to the simulating advertiser client bidder, receive revised filter parameters from the simulating advertising client bidder, wherein the revised filter parameters are selected based on the provided report;
receive a second online advertisement impression opportunity package from at least one external online auction server; and
based on the revised filter parameters of the simulating advertiser client bidder, providing an advertisement to the external online auction server for display to a viewer corresponding to the second online advertisement impression opportunity package.

10. The system of claim 9, further comprising instructions that, when executed by the one or more servers, cause the system to operate the internal auction by repeatedly filtering additional impression opportunities for the real advertiser client bidder until a criterion is met that indicates a campaign corresponding to the internal auction for the real advertiser client bidder should end.

11. The system of claim 10, further comprising instructions that, when executed by the one or more servers, cause the system to generate a second report for the real advertiser client bidder indicating a total number of impression opportunities that remained after filtering the online advertisement impression and the additional impression opportunities.

12. The system of claim 11, further comprising instructions that, when executed by the one or more servers, cause the system to, based on a determination that the second online advertisement impression opportunity package matches the revised filtering parameters, respond to the second online advertisement impression opportunity package by sending a bid response package corresponding to the advertisement.

13. The system of claim 12, wherein the bid response package comprises the advertisement and the real bid for utilization in an external auction conducted by the at least one external online auction server.

14. The system of claim 9, further comprising instructions that, when executed by the at least one processor, cause the system to:
in response to providing the report to the simulating advertiser client bidder, receive a revised bid for the simulating advertising client bidder, wherein the revised bid is selected based on the provided report;
operate a second internal auction for the second online advertisement impression opportunity package based on the revised bid for the simulating advertising client bidder; and
provide the advertisement to the external online auction server for display to the viewer based on a determination that the revised bid is the highest bid of the second internal auction.

15. The system of claim 9, further comprising instructions that, when executed by the at least one processor, cause the system to operate the internal auction by:
receiving a second bid from a second real advertiser client bidder;
determining that the bid from the real advertiser client bidder and the second bid from the second real advertiser client bidder are equivalent highest bids;
determining that the bid from the real advertiser client bidder is more relevant to the online advertisement impression opportunity than the second real bid based on a browser cookie associated with the online advertising impression opportunity package; and
sending the bid from the real advertiser client bidder for the online advertisement impression opportunity package to the external online auction server based on the determination that that the bid from the real advertiser client bidder and the second bid are equivalent highest bids and the determination that the bid from the real advertiser client bidder is more relevant to the online advertisement impression opportunity than the second bid.

16. The system of claim 9, further comprising instructions that, when executed by the one or more servers, cause the system to:
generate a relevance score for the online advertisement impression opportunity package based on context of an advertisement corresponding to the real advertiser client bidder, viewer characteristics corresponding to the online advertisement impression opportunity package, and campaign targeting criteria for the real advertiser client bidder; and
adjust the bid for the real advertiser client bidder based on the generated relevance score.

17. The system of claim 16, further comprising instructions that, when executed by that one or more servers, cause the system to:
receive a maximum bid limit for an overall campaign corresponding to the real advertiser client bidder;
determine that the generated relevance score is greater than a predetermined threshold value; and
based on the determination that the generated relevance score is greater than the predetermined threshold value adjust the bid to the maximum bid limit.

18. The method of claim 1, wherein the online advertisement impression opportunity package includes a viewer identification that identifies the viewer, wherein the viewer identification is stored in a browser cookie of the viewer.

* * * * *